United States Patent [19]

Suh et al.

[11] 4,085,073
[45] Apr. 18, 1978

[54] STYRENE POLYMER FOAM AND THE PREPARATION THEREOF

[75] Inventors: Kyung W. Suh; Graydon Wayne Killingbeck, both of Midland, Mich.

[73] Assignee: The Dow Chemical Company, Midland, Mich.

[21] Appl. No.: 737,887

[22] Filed: Nov. 2, 1976

Related U.S. Application Data

[63] Continuation-in-part of Ser. No. 628,618, Nov. 4, 1975, abandoned.

[51] Int. Cl.$^2$ .............................................. C08J 9/14
[52] U.S. Cl. .......................... 260/2.5 E; 260/2.5 HB; 260/2.5 FP; 264/50; 264/DIG. 5
[58] Field of Search .......... 260/2.5 B, 2.5 HB, 2.5 E; 264/DIG. 5, 53

[56] References Cited

U.S. PATENT DOCUMENTS

| | | | |
|---|---|---|---|
| 3,449,268 | 6/1969 | Scheffler | 260/2.5 B |
| 3,766,099 | 10/1973 | Kawai et al. | 260/2.5 HA |
| 3,900,433 | 8/1975 | Taub | 260/2.5 B |
| 3,960,792 | 6/1976 | Nakamura | 260/2.5 HB |

*Primary Examiner*—Morton Foelak
*Attorney, Agent, or Firm*—R. B. Ingraham

[57] ABSTRACT

Stable medium density large cell size styrene polymer foam is extruded in large sections employing as blowing agents: chlorofluoromethane, bromochlorodifluoromethane alone or in admixture with minor quantities of other halogen containing carbon compounds to provide machinable foams of good dimensional stability.

12 Claims, No Drawings

STYRENE POLYMER FOAM AND THE PREPARATION THEREOF

This application is a continuation-in-part of application Ser. No. 628,618, filed Nov. 4, 1975 now abandoned.

Extruded styrene polymer foams such as polystyrene foams are highly desirable for many applications including: insulation, floatation, decorative purposes and the like. A particularly desirable foam for decorative purposes and other applications wherein a foamed article is fabricated by cutting, carving or machining of a larger extruded foam block generally requires a foam of relatively large cell size. Generally it is desirable that the cell size of such foams be from about 1.2 to 3 millimeters and beneficially from 1.4 to 2.6 millimeters. When styrene polymer foams have smaller cell size, generally they do not machine as well and often exhibit torn or ruptured surfaces. Generally the smaller the cell size of the foam, the more difficult it is to obtain a desirable clean surface employing techniques generally utilized in conventional woodworking. Hot wire foam cutting techniques may readily be employed on either large cell or small cell foams, however, for many purposes it is undesirable to employ hot wire cutting. Most larger cell styrene polymer foam has been prepared employing methyl chloride as a blowing agent. Because of the relatively high toxicity of methyl chloride, foam cutting operations must be well ventilated and frequently checked to insure that dangerous concentrations of methyl chloride do not occur. Any blowing agent which would replace methyl chloride desirably should have a lower level of toxicity and flammability. Advantageously the blowing agent should decompose fairly readily in the atmosphere when it is released from the foam by one means or the other.

It would be desirable if there were available an improved styrene polymer foam which is dimensionally stable.

It would also be desirable if there were available an improved styrene polymer foam having a relatively large cell size and being readily machined by woodworking techniques.

It would also be desirable if there were available an improved styrene polymer foam having a blowing agent or expanding agent of reduced toxicity.

These benefits and other advantages in accordance with the present invention are achieved in an alkenylaromatic thermoplastic synthetic resinous elongate foam body having a machine direction and a transverse direction, the body being formed of a polymer of at least 70 weight percent of a monomer of the formula:

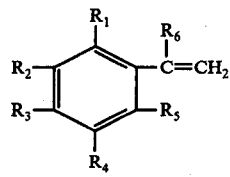

wherein $R_{1-5}$ are individually selected from hydrogen, chlorine, bromine and lower alkyl radicals containing up to 4 carbon atoms, $R_6$ is hydrogen or methyl, with the further limitation that the maximum number of carbon atoms is 12, and the remainder of the polymer being another ethylenically unsaturated monomer copolymerizable therewith, the body defining a plurality of closed non-interconnecting gas-containing cells therein, the cells having an average cell size of from about 1.2 to 3 millimeters and advantageously from about 1.4 to 2.6 millimeters, the foam body being a generally uniform cellular structure being without discontinuities, being without substantial variations in average cell size when cell size is measured by averaging cell diameters across the minimal cross-sectional dimension of the body (such as by ASTM Method D2842-69), the elongate body having a cross-sectional area of at least 18 square inches and having a minimum cross-sectional dimension of at least one inch, the foam body having a water vapor permeability not greater than 1.8 perm inches as measured by ASTM Method C355-64, procedure for Dessicant Method, the body having a density of from about 1.4 to 5 pounds per cubic foot the body being a continuous hardened thermoplastic gel, with the further limitation that the cells contain a blowing agent having as a major component thereof at least 70 weight percent of member selected from the group consisting of chlorofluoromethane, bromochlorodifluoromethane, and mixtures thereof.

By the term "alkenyl aromatic thermoplastic synthetic resin" is meant a solid polymer of one or more polymerizable alkenyl aromatic compounds. The polymer or copolymer comprises in chemically combined form, at least 70 percent by weight of at least one alkenyl aromatic compound having the general formula

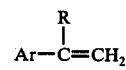

wherein Ar represents an aromatic hydrocarbon radical, or an aromatic halo-hydrocarbon radical of the benzene series, and R is hydrogen or the methyl radical. Examples of such alkenyl aromatic resins are the solid homopolymers of styrene, a-methylstyrene, o-methylstyrene, m-methylstyrene, p-methylstyrene, ar-ethylstyrene; ar-vinylxylene, ar-chlorostyrene or ar-bromostyrene; the solid copolymers of one or more of such alkenyl aromatic compounds with minor amounts of other readily polymerizable olefinic compounds such as methylmethacrylate, acrylonitrile, maleic anhydride, citraconic anhydride, itaconic anhydride, rubber reinforced (either natural or synthetic) styrene polymers, etc.

Volatile fluid foaming agents useful in the practice of the present invention include those blowing agents which have as a major component thereof: chlorofluoromethane, bromochlorodifluoromethane and mixtures thereof. Particularly advantageous are chlorofluoromethane and mixtures of chlorofluoromethane containing up to 25 weight percent 1,1-difluoro-1-chloroethane, and chlorofluoromethane with up to 15 weight percent 1,1-difluoro ethane. Also functional, but less desirable from an ecological standpoint relating to ozone depletion, are mixtures of chlorofluoromethane with up to 25 weight percent dichlorodifluoromethane, chlorofluoromethane with up to 30 weight percent, bromochlorodifluoromethane and chlorofluoromethane with up to 25 weight percent dichlorotetrafluoroethane.

Generally in the preparation of alkenyl aromatic resinous polymer foams in accordance with the present invention, it is most conventionally done in a manner substantially as shown and described in U.S. Pat. No.

2,669,751, wherein the volatile fluid foaming agent is injected into a heat-plastified polymer stream within an extruder. From the extruder the heat-plastified gel is passed into a mixer, the mixer being a rotary mixer wherein a studded rotor is enclosed within a housing which has a studded internal surface which intermeshes with the studs on the rotor. The heat plastified gel from the extruder is fed into the end of the mixer and discharged from the remaining end, the flow being in a generally axial direction. From the mixer, the gel passes through coolers such as are described in U.S. Pat. No. 2,669,751 and from the coolers to a die which extrudes a generally rectangular board.

In the preparation of foams in accordance with the present invention, it is often desirable to add a nucleating agent to reduce the cell size. Talc, calcium silicate, indigo, and the like are suitable agents which reduce cell size.

EXAMPLE 1

Granular polystyrene resin having a viscosity of 13.4 centipoise, as measured as a 10 percent solution in toluene at 25° C, containing mixed therewith 0.015 part magnesium oxide 3 parts by weight monochloropentabromocyclohexane (of commercial purity) and 0.075 part barium stearate per hundred parts of resin was fed to an extrusion assembly generally as shown in U.S. Pat. No. 2,669,751 at a rate of 100 parts by weight per hour. The blowing agent was injected into the barrel of the extruder continuously and talc in powdered form was added to the feed where indicated. Polystyrene foam was extruded as a rectangular board having a cross-sectional dimension of about 2 inches × 9 inches. The pressure at the die was from 300 to 900 pounds per square inch and foaming temperatures were from 105° to 120° C. The feed rates and results are set forth in the following Table.

TABLE I

| Operating Conditions and properties | Examples | | | | |
|---|---|---|---|---|---|
| | Chloro-fluoro-methane | Chloro-fluoro-methane | Chloro-fluoro-methane | Chloro-fluoro-methane | Bromo-chloro-difluoro-methane |
| Blowing agent rate (pph) | 13.0 | 14.5 | 14.5 | 14.7 | 28.0 |
| Blowing agent rate (pph) | 13.0 | 14.5 | 14.5 | 14.7 | 28.0 |
| Talc rate (pph) | 0 | 0.01 | 0.01 | 0.01 | 0 |
| Foam density (pcf) | 1.58 | 1.63 | 1.63 | 1.71 | 2.24 |
| Average cell size (mm) | 3.24 | 1.72 | 1.91 | 1.80 | 1.3 |
| Heat distortion temp. (° F) | — | 170 | 170 | 180 | 165 |
| Compressive strength (psi) | | | | | |
| Vertical | — | 21.8 | 6.4 | 22.1 | 21.0 |
| Horizontal | — | 16.0 | 16.1 | 18.8 | 26.7 |
| Extrusion | — | 15.4 | 12.8 | 15.8 | 22.1 |
| Machineability | poor | good | good | good | fair |
| Foam stability at 40° F | — | stable | stable | stable | — |
| Feasibility | works | works | works | works | works | pph = parts per hundred of resin
pcf = pounds per cubic foot

Heat distortion temperature was determined by subjecting a 1 inch × 1 inch × 6 inch sample of foam in a hot air oven at various temperatures for a period of one hour. The highest temperatures at which no visual distortion is observed, is recorded as the heat distortion temperature. The compressive strengths were measured on two-inch cubes taken across the extruded plank. Each value reported for compressive strength is the average of 3 determinations. Machineability was determined by employing a router blade. The blade had a total width of 3 and 3/32 of an inch, a depth of 2 and ¼ inches and formed a concave semi-circular recess in one major edge having a radius of about 1 and ½ inches. The blade is 1/16 of an inch in thickness and cutting edges are beveled 3/32 of an inch. On rotation of the blade in foam, a cylindrical cavity was routed having a hemisphere protruding into the bottom thereof. The cutter was used in a drill press with a spindle rotation of 4250 revolutions per minute. The quality of the cut was judged by inspecting the freshly cut surface. Foam stability at 40° F was determined by providing a 6-inch thick full cross-section of the extruded foam plank in a closed, temperature controlled chamber for a period of about two months. After a period of two months, the dimensional changes in length, width, height or thickness were measured as a function of time. If the maximum change in any dimension was less than ⅛ of an inch, the foam was considered to be stable.

EXAMPLE 2

The equipment and procedure of Example 1 were employed to show the effect of a nucleator or cell size control additive on the cell size and density of polystyrene foam prepared with chlorofluoromethane as the blowing agent. Magnesium oxide was used at a level of about 0.02 parts per 100, barium stearate at a level of about 0.1 parts per 100 and monochloropentabromocyclohexane at a level of about 3 to 4 parts per 100. Foam was extruded and feed changed when equilibrium was obtained, samples were taken and density and cell size measured. The results are set forth in Table II.

TABLE II

| Talc (pph) | Indigo (pph) | Chlorofluoromethane (pph) | Foam Density (pcf) | Cell Size (mm) |
|---|---|---|---|---|
| 0 | 0 | 13.0 | 1.58 | 3.2 |
| 0.01 | 0 | 14.5 | 1.63 | 1.7 |
| 0.35 | 0 | 14.5 | 1.77 | 0.65 |
| 0.5 | 0.25 | 14.5 | 2.19 | 0.35 |
| 0.5 | 0.5 | 14.0 | 2.71 | 0.29 |

As the quantity of nucleating agent such as indigo and talc was increased, the foam density increases and the cell size decreases.

EXAMPLE 3

Employing the procedure of Example 1 a variety of foam extrusions were made employing chlorofluoromethane as the principal blowing agent. The results are set forth in Table III wherein the amount of chlorofluoromethane is shown as percent and a secondary blowing agent is also identified by name and as percentage of the total blowing agent.

TABLE III

| Chlorofluoromethane (%) | Secondary Blowing Agent | Total Blowing Agent Level (pph) | Talc (pph) | Foam Density (pcf) | Cell Size (mm) | Machineability |
| --- | --- | --- | --- | --- | --- | --- |
| 100 | — | 13.0 | 0 | 1.58 | 3.2 | Poor |
| 100 | — | 14.5 | 0.01 | 1.63 | 1.9 | Good |
| 85 | 15% Chlorodifluoromethane | 15.0 | 0 | 1.57 | 1.7 | Good |
| 80 | 20% Chlorodifluoromethane | 13.7 | 0 | 1.70 | 1.6 | Good |
| 90 | 10% 1,1-Difluoroethane | 14.0 | 0 | 1.81 | 1.5 | Good |
| 86 | 14% 1,1-Difluoroethane | 14.5 | 0 | 1.58 | 1.2 | Fair |
| 80 | 20% 1,1-Difluoroethane | 13.5 | 0 | 1.78 | 1.0 | Fair |
| 80 | 20% Dichlorodifluoromethane | 14.5 | 0 | 1.77 | 1.4 | Good |
| 80 | 20% Bromochlorodifluoromethane | 14.5 | 0 | 1.88 | 1.6 | Good |
| 80 | 20% 1,1-Difluoro-1-chloroethane | 14.5 | 0 | 1.64 | 1.4 | Good |

It can be observed from the results that optimum machineability is obtained in the cell size range of about 1.4 to 2 millimeters.

EXAMPLE 4

A comparison was made between methyl chloride, chlorofluoromethane alone and chlorofluoromethane containing 15 weight percent chlorodifluoromethane. The results are set forth in Table IV.

TABLE IV

| Operating Conditions | Methyl Chloride | Chlorofluoromethane | 85% Chlorofluoromethane/ 15% Chlorodifluoromethane |
| --- | --- | --- | --- |
| Blowing Agent Rate (pph) | 9.64 | 14.5 | 15.0 |
| Talc Rate (pph) | 0.03 | 0.01 | 0 |
| Foam Density (pcf) | 1.62 | 1.63 | 1.63 |
| Average Cell Size (mm) | 1.91 | 1.91 | 1.87 |
| Heat Distortion Temp. (° F) | 170 | 170 | 165 |
| Compressive Strength (psi) | | | |
| Vertical | 14.8 | 16.4 | 17.8 |
| Horizontal | 21.5i | 16.1 | 19.7 |
| Extrusion | 11.3 | 12.8 | 16.3 |
| Machineability | Good | Good | Good |
| Foam Stability at 40° F | Collapsed | Stable | Stable |

The foregoing illustrates the propensity of foams prepared with methyl chloride to collapse.

EXAMPLE 5

A variety of foams hereinbefore prepared are evaluated for dimensional stability.

The distortion pressure of a foam was determined by placing a 2-inch thick full cross-section of the foam being tested in a pressure chamber and the amount of air pressure required to distort or collapse the sample ½ of an inch in the extrusion direction in a period of two minutes is determined. Fresh samples are employed for each determination. Generally such determinations are carried out at intervals over a period of about 70 to 80 days. A distortion value for the foam is obtained by subtracting the minimum distortion pressure obtained in the periodic measurements of the foam from the distortion pressure at the time zero. The smaller this value, in general, the more stable the foam. The results are set forth in the following tabulations.

Distortion Pressure vs. Time
1. Methyl Chloride - Polystyrene System

| Time (day) | Distortion Pressure (psig) |
| --- | --- |
| 0 | 13.7 |
| 6 | 9.25 |
| 13 | 8.30 |
| 20 | 8.50 |
| 27 | 9.25 |
| 41 | 10.3 |
| 55 | 12.9 |
| 70 | 14.1 |

13.7 − 8.30 = 5.4 psig

2. 80 Chlorofluoromethane/20 Chlorodifluoromethane - Polystyrene System

| Time (day) | Distortion Pressure (psig) |
| --- | --- |
| 0 | 12.0 |
| 7 | 10.8 |
| 13 | 10.4 |
| 20 | 10.7 |
| 27 | 11.2 |
| 34 | 11.8 |
| 48 | 12.3 |
| 62 | 14.2 |
| 77 | 14.7 |

12.0 − 10.4 = 1.6 psig

3. 85 Chlorofluoromethane/15 Chlorodifluoromethane - Polystyrene System

| Time (day) | Distortion Pressure (psig) |
| --- | --- |
| 0 | 12.0 |
| 7 | 9.8 |
| 13 | 10.2 |
| 20 | 10.3 |
| 27 | 11.0 |
| 34 | 11.5 |
| 48 | 12.8 |
| 62 | 14.6 |
| 77 | 14.9 |

12.0 − 9.8 = 2.2 psig

4. 80 Chlorofluoromethane/20 1,1-Difluoroethane - Polystyrene System

| Time (day) | Distortion Pressure (psig) | |
|---|---|---|
| 0 | 15.3 | |
| 7 | 14.3 | |
| 14 | 13.8 | |
| 21 | 14.5 | |
| 28 | 14.7 | |
| 42 | 16.5 | 15.3 − 13.8 = 1.5 psig |

5. 90 Chlorofluoromethane/10 1,1-Difluoroethane - Polystyrene System

| Time (day) | Distortion Pressure (psig) | |
|---|---|---|
| 0 | 10.5 | |
| 5 | 10.7 | |
| 20 | 10.1 | |
| 27 | 10.4 | |
| 32 | 10.3 | |
| 46 | 11.5 | 10.5 − 10.1 = 0.4 psig |

6. 80 Chlorofluoromethane/20 1,1-Difluoro-1-chloroethane- Polystyrene System

| Time (day) | Distortion Pressure (psig) | |
|---|---|---|
| 0 | 10.5 | |
| 8 | 8.6 | |
| 15 | 9.6 | |
| 20 | 10.4 | |
| 34 | 12.8 | 10.5 − 8.6 = 1.9 psig |

7. 80 Chlorofluoromethane/20 Dichlorodifluoromethane- Polystyrene System

| Time (day) | Distortion Pressure (psig) | |
|---|---|---|
| 0 | 11.8 | |
| 5 | 12.0 | |
| 20 | 11.0 | |
| 27 | 11.4 | |
| 32 | 11.8 | |
| 46 | 12.7 | 11.8 − 11.0 = 0.8 psig |

8. 80 Chlorofluoromethane/20 Bromochlorodifluoromethane- Polystyrene System

| Time (day) | Distortion Pressure (psig) | |
|---|---|---|
| 0 | 10.5 | |
| 5 | 10.5 | |
| 20 | 9.8 | |
| 27 | 10.1 | |
| 32 | 10.0 | |
| 46 | 10.8 | 10.5 − 9.8 = 0.7 psig |

The distortion values for the samples 1–8 are set forth in Table V.

TABLE V

| | (psi) |
|---|---|
| 1. Methyl Chloride | 5.4 |
| 2. 80/20 Chlorofluoromethane/Chlorodifluoromethane | 1.6 |
| 3. 85/15 Chlorofluoromethane/Chlorodifluoromethane | 2.2 |
| 4. 80/20 Chlorofluoromethane/1,1-Difluoroethane | 1.5 |
| 5. 90/10 Chlorofluoromethane/1,1-Difluoroethane | 0.4 |
| 6. 80/20 Chlorofluoromethane/1,1-Difluoro-1-chloroethane | 1.9 |
| 7. 80/20 Chlorofluoromethane/Dichlorodifluoromethane | 0.8 |
| 8. 80/20 Chlorofluoromethane/Bromochlorodifluoromethane | 0.7 |

The foams of Examples 1–5 all have a water vapor permeability of less than 1.8 perm inch.

The following mixed blowing agent compositions can be used to produce foam with a cell size greater than 1.4 mm.

a. 75–100% Chlorofluoromethane/0–25% 1,1-Difluoro-1-chloroethane b. 75–100% Chlorofluoromethane/0–25% Chlorodifluoromethane c. 85–100% Chlorofluoromethane/0–15% 1,1-Difluoroethane d. 75–100% Chlorofluoromethane/0–25% Dichlorodifluoromethane e. 70–100% Chlorofluoromethane/0–30% Bromochlorodifluoromethane f. 75–100% Chlorofluoromethane/0–25% Dichlorotetrafluoroethane and mixtures thereof. All percentages are by weight.

Other useful secondary blowings of diluents include hydrocarbons having a boiling point between about −60° C and about 40° C for example, propane, propylene, butane, butylene, isobutylene, isobutane, pentane, isopentane, neopentane and the like, fluorine containing carbon compounds boiling in the same range such as methylene fluoride, trichlorofluoromethane, dichlorofluoromethane, 2-chloro-1,1-difluoroethane, 1,1,1-trifluoroethane, 1,1,1-trifluoro2-chloroethane, 1,1,1,2-tetrafluoro-2-chloroethane, pentafluoroethane, chloropentafluoroethane, 2,2-difluoropropane, 1,1,1-fluoropropane, perfluoropropane, 1,1,1-trifluoropropene and the like.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. An alkenyl aromtic thermoplastic synthetic resinous elongate foam body having a machine direction and a transverse direction, the body defining a plurality of closed noninterconnecting gas containing cells therein, the cells having an average cell size of from about 1.2 to 3 millimeters, the foam body being a generally uniform cellular structure and being without discontinuities, being without substantial variation in average cell size when cell size is measured by averaging cell diameter across the minimum cross-sectional dimension of the body, the elongate body having a cross-sectional area of at least 18 square inches and having a minimum cross-sectional dimension of at least one inch, the foam body having a water vapor permeability not greater than 1.8 perm inches, a density of from about 1.4 to about 5 pounds per cubic foot the body being a continuous hardened thermoplastic gel with the further limitation that the cells contain a blowing agent having as a major component thereof at least 70 weight percent of a member selected from the group consisting of chlorofluoromethane, bromochlorodifluoromethane, and mixtures thereof.

2. The foam body of claim 1 wherein the average cell size is from about 1.4 to 2.6 millimeters.

3. The foam body of claim 1 wherein the blowing agent comprises chlorofluoromethane.

4. The body of claim 1 wherein the blowing agent comprises bromochlorodifluoromethane.

5. The body of claim 1 wherein the alkenyl aromatic synthetic resinous body comprises polystyrene.

6. The body of claim 1 wherein the blowing agent is selected from the group consisting of:
 a. 75–100% Chlorofluoromethane/0–25% 1,1-Difluoro-1-chloroethane
 b. 75–100% Chlorofluoromethane/0–25% Chlorodifluoromethane
 c. 85–100% Chlorofluoromethane/0–15% 1,1-Difluoroethane
 d. 75–100% Chlorofluoromethane/0–25% Dichlorodifluoromethane
 e. 70–100% Chlorofluoromethane/0–30% Bromochlorodifluoromethane
 f. 75–100% Chlorofluoromethane/0–25% Dichlorotetrafluoroethane and mixtures thereof.

7. A foamed polystyrene elongate body having a machine direction and a transverse direction, the body defining a plurality of closed noninterconnecting gas containing cells therein, the cells having an average cell size of from about 1.2 to 3 millimeters, the foamed body being a generally uniform cellular structure, being without discontinuities, being without substantial variations in average cell size when cell size is measured by average cell diameter across the minimum cross-sectional dimension of the body, the body having a cross-sectional area of at least 18 square inches and having a minimum cross-sectional dimension of at least one inch, the body having a water vapor permeability not greater than 1.8 perm inches, a density of from about 1.4 to 5 pounds per cubic foot the body being a continuous hardened thermoplastic gel with the further limitations that the cells contain a blowing agent having a major component thereof at least 70 weight percent of a member selected from the group consisting of chlorofluoromethane, bromochlorodifluoromethane, and mixtures thereof.

8. The foam body of claim 7 wherein the average cell size is from about 1.4 to 2.6 millimeters.

9. The foam body of claim 7 wherein the blowing agent comprises chlorofluoromethane.

10. The body of claim 7 wherein the blowing agent comprises bromochlorodifluoromethane.

11. The body of claim 7 wherein the alkenyl aromatic synthetic resinous body comprises polystyrene.

12. The body of claim 7 wherein the blowing agent is selected from the group consisting of:
 a. 75–100% Chlorofluoromethane/0–25% 1,1-Difluoro-1-chloroethane
 b. 75–100% Chlorofluoromethane/0–25% Chlorodifluoromethane
 c. 85–100% Chlorofluoromethane/0–15% 1,1-Difluoroethane
 d. 75–100% Chlorofluoromethane/0–25% Dichlorodifluoromethane
 e. 70–100% Chlorofluoromethane/0–30% Bromochlorodifluoromethane
 f. 75–100% Chlorofluoromethane/0–25% Dichlorotetrafluoroethane and mixtures thereof.

* * * * *

UNITED STATES PATENT AND TRADEMARK OFFICE
CERTIFICATE OF CORRECTION

PATENT NO. : 4,085,073
DATED : April 18, 1978
INVENTOR(S) : Kyung W. Suh and Graydon Wayne Killingbeck It is certified that error appears in the above-identified patent and that said Letters Patent are hereby corrected as shown below:

Column 3, Table I, under the heading "Chlorofluoromethane" the seventh set of numbers down which reads "6.4" should read --16.4--.

Column 5, Table IV, under the heading "Methyl Chloride", the seventh set of numbers down which reads "21.5i" should read --21.5--.

Column 5, in Table IV, the second heading which reads "Fluoromethane" should read --Chlorofluoromethane--.

Column 5, in Example 5, line 58, the number "1/2" at the end of the line should read --1/8--.

Column 8, line 35, the term "1,1,1-trifluoro2-chloroethane" should read --1,1,1-trifluoro-2-chloroethane--.

Column 8, line 51, in the first line of Claim 1, the word "aromtic" should read --aromatic--.

Signed and Sealed this

Nineteenth Day of September 1978

[SEAL]

Attest:

RUTH C. MASON
*Attesting Officer*

DONALD W. BANNER
*Commissioner of Patents and Trademarks*